(12) United States Patent
Barre et al.

(10) Patent No.: US 10,086,771 B2
(45) Date of Patent: Oct. 2, 2018

(54) HEIGHT-ADJUSTABLE SUPPORT FOR A MOBILE DEVICE

(71) Applicants: PEUGEOT CITROEN AUTOMOBILES SA, Velizy Villacoublay (FR); FAURECIA INTERIEUR INDUSTRIE, Nanterre (FR)

(72) Inventors: Philippe Barre, Joinville le Pont (FR); Julien Beauregard, Mesnil en Thelle (FR); Christophe Brunard, Bois Colombes (FR); Sergio Da Costa Pito, Courdimanche (FR); Bruno Dinant, Saint-Brice-Sous-Foret (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 15/033,640

(22) PCT Filed: Oct. 29, 2014

(86) PCT No.: PCT/FR2014/052756
§ 371 (c)(1),
(2) Date: Apr. 30, 2016

(87) PCT Pub. No.: WO2015/063421
PCT Pub. Date: May 7, 2015

(65) Prior Publication Data
US 2016/0257260 A1     Sep. 8, 2016

(30) Foreign Application Priority Data

Oct. 30, 2013   (FR) ...................................... 13 60629

(51) Int. Cl.
*B60R 11/02*     (2006.01)
*F16M 11/04*     (2006.01)
(Continued)

(52) U.S. Cl.
CPC ........... *B60R 11/02* (2013.01); *F16M 11/041* (2013.01); *F16M 13/00* (2013.01); *F16M 13/02* (2013.01);
(Continued)

(58) Field of Classification Search
CPC ...... F16M 11/041; F16M 13/00; F16M 13/02; G06F 1/1632; H04M 1/04; B60R 2011/0005; B60R 2011/0075
(Continued)

(56) References Cited

U.S. PATENT DOCUMENTS 5,457,745 A * 10/1995 Wang .................. B60R 11/0241
                                                                    379/426
5,903,645 A *  5/1999 Tsay .................... B60R 11/0241
                                                                    248/316.4
(Continued)

FOREIGN PATENT DOCUMENTS

EP     2431229 A1    3/2012
FR     2957038 A1    9/2011

OTHER PUBLICATIONS

International Search Report corresponding to International application No. PCT/FR2014/052756, dated Mar. 18, 2015, 2 pages.
(Continued)

*Primary Examiner* — Peter Helvey
(74) *Attorney, Agent, or Firm* — Reising Ethington P.C.

(57) ABSTRACT

A support for a mobile device has a front face bearing a stationary jaw. The support includes a moving jaw facing the stationary jaw, mounted in translation on the front face of the support. The moving jaw is able to receive a side edge of the mobile device, and the support further includes at least one guide ramp secured to the support, on which the moving jaw is slidingly mounted between a separated position, in which the mobile device is placed against the moving jaw, and a
(Continued)

maintaining position, in which the mobile device is kept pressed against the stationary jaw. The support includes at least one return element, secured to the support, cooperating with the moving jaw over the entire length of the guide ramp and able to grip the mobile device against the stationary jaw.

12 Claims, 7 Drawing Sheets

(51) Int. Cl.
    *F16M 13/00*     (2006.01)
    *H04M 1/04*     (2006.01)
    *G06F 1/16*     (2006.01)
    *F16M 13/02*     (2006.01)
    *B60R 11/00*     (2006.01)

(52) U.S. Cl.
    CPC ............ *G06F 1/1632* (2013.01); *H04M 1/04* (2013.01); *B60R 2011/0005* (2013.01); *B60R 2011/0075* (2013.01)

(58) Field of Classification Search
    USPC ........................................................ 224/483
    See application file for complete search history.

(56) References Cited

U.S. PATENT DOCUMENTS

| | | | | |
|---|---|---|---|---|
| 8,136,780 | B2* | 3/2012 | Lin | ................ F16M 11/28 |
| | | | | 248/316.4 |
| 8,490,937 | B2* | 7/2013 | Crain | ................ G01C 15/00 |
| | | | | 224/929 |
| 8,708,296 | B2 | 4/2014 | Nemoto | |
| 8,833,716 | B2* | 9/2014 | Funk | ................ F16M 13/02 |
| | | | | 248/309.1 |
| 9,097,380 | B2* | 8/2015 | Wheeler | ................ A47F 7/024 |
| 9,103,487 | B2* | 8/2015 | Hale | ................ F16M 13/022 |
| 9,618,153 | B2* | 4/2017 | Hale | ................ F16M 13/02 |
| 2007/0284500 | A1* | 12/2007 | Fan | ................ B60R 11/02 |
| | | | | 248/346.06 |
| 2011/0143583 | A1 | 6/2011 | Zilmer et al. | |
| 2012/0126083 | A1 | 5/2012 | Nemoto | |
| 2013/0233986 | A1 | 9/2013 | Rasheta | |
| 2014/0097306 | A1* | 4/2014 | Hale | ................ F16M 13/022 |
| | | | | 248/122.1 |

OTHER PUBLICATIONS

Written Opinion, in French, corresponding to International application No. PCT/FR2014/052756, dated Mar. 18, 2015, 5 pages.

* cited by examiner

HEIGHT-ADJUSTABLE SUPPORT FOR A MOBILE DEVICE

TECHNICAL FIELD

The present invention relates to a support for a portable device, also called mobile device, and more particularly relates to a support for a mobile electronic device of the Smartphone or tablet type in a motor vehicle.

BACKGROUND

Supports are known of the type comprising a fixed base for receiving the electronic device and a retaining member mounted movably on the base between a separated position, in which the electronic device can be placed on the receiving base, and a retaining position, in which the retaining member retains the electronic device on the receiving base, the retaining member being mounted in translation relative to the stationary base in a translation direction between the separated position and the retaining position.

A growing number of mobile electronic apparatuses having a large number of functionalities are available to users, and in particular motor vehicle drivers.

In particular, devices of the mobile telephone type, in particular "Smartphones", personal digital assistants (PDA) or geolocation devices, in particular using GPS (Global Positioning System), for example make it possible to help a motor vehicle driver determine a route, provide him with information on traffic conditions, or assist him in driving the vehicle.

Such apparatuses are for example controlled using a touchscreen that must be accessible to the driver, but without requiring the driver to hold the device, which would be dangerous for driving the vehicle.

Thus, it is known to provide a support for the electronic device close to the driver, for example on the dashboard of the motor vehicle, in order to maintain the device there while leaving the screen free so that it can be controlled without holding it.

Faced with the diversity of these devices, and in particular their dimensions, it is known to provide an adjustable support adapting to several types of devices, in particular to their height. To that end, the support generally comprises means for retaining the lower edge and the upper edge of the electronic device; the means for retaining the upper edge being height-adjustable so as to adapt the support to the height of the device received by said support.

Also known from document FR2974049 is a support for an electronic device of the aforementioned type, including a plurality of blocking surfaces defining notches corresponding to several retaining positions of the retaining means. The blocking surfaces are spaced apart from one another in the translation direction. A locking element, made up of a flexible spring blade secured in translation with the retaining member, is able to translate from one blocking surface to another to adapt the holder to the height of the mobile device.

This solution has one major drawback: the adjustment travel of the retaining means is not continuous. Thus, despite the small gap present between two successive blocking positions, there are still several millimeters between each blocking position, and therefore the optimal maintenance of mobile devices with varying dimensions is not guaranteed.

SUMMARY

The invention in at least some embodiments makes it possible to offset these drawbacks by proposing a mobile device holder with a simplified adjustment by limiting the number of manipulations only requiring the use of one hand.

The support is easily adjustable by simple pressure on the moving jaw.

One thus has a simple system for the precise adjustment of the separation between the stationary jaw and the moving jaw throughout the entire translational travel of the moving jaw (continuous adjustment) and the stable blocking of the moving jaw in any position of the moving jaw.

To that end, the invention provides embodiments of a support for a mobile device comprising a front face bearing a stationary jaw secured to the support, said support also comprising a moving jaw facing the stationary jaw, mounted in translation on the front face of the support, characterized in that the moving jaw is able to receive a side edge of the mobile device, and in that the support further includes at least one guide ramp secured to the support, on which the moving jaw is slidingly mounted between a separated position, in which the mobile device is placed against the moving jaw, and a maintaining position, in which the mobile device is kept pressed against the stationary jaw, and in that it further includes at least one return element, secured to the support, cooperating with the moving jaw over the entire length of the guide ramp and able to grip the mobile device against the stationary jaw stably in any position of the moving jaw between the separated position and the maintaining position.

According to one feature, the return element includes a barrel spring mounted rotatably on the stationary jaw and the free end of which is fastened to the moving jaw.

According to another feature, the guide ramp is a cylindrical tube.

According to another feature, the front face of the support is generally rectangular, defining a frame comprising an opening, and in that the stationary and moving jaws are generally rectangular and respectively extend parallel to one another and parallel to one of the edges of the frame; the moving jaw being able to translate in a direction perpendicular to that along which its large dimension extends.

According to another feature, it comprises a housing extending behind the support from the front face of the support and defining a storage space accessible through the opening of the frame.

According to another feature, the moving jaw is able to close off said opening.

According to another feature, the housing is integral with the support.

According to another feature, the support comprises two guide ramps, each of them being positioned on either side of the opening of the frame, and in that it includes two return elements, each of them being positioned across from each of the ends of the large dimension of the moving jaw.

According to another feature, the moving jaw is the lower jaw, considering the support oriented in its usage position.

The invention also relates to a motor vehicle dashboard, characterized in that it comprises a support as described above and the body of which is either integral with the dashboard or attached on the dashboard.

BRIEF DESCRIPTION OF THE DRAWINGS

Other aspects and advantages of the invention will appear upon reading the following description, provided as an example, and done in reference to the appended drawings, in which.

DETAILED DESCRIPTION

In the figures, identical elements are designated using the same references.

Hereinafter, the indicated orientations, such as "upper", "lower", "top", "bottom", "transverse" and "longitudinal", correspond to those of a motor vehicle in the assembled state.

Figure 1:
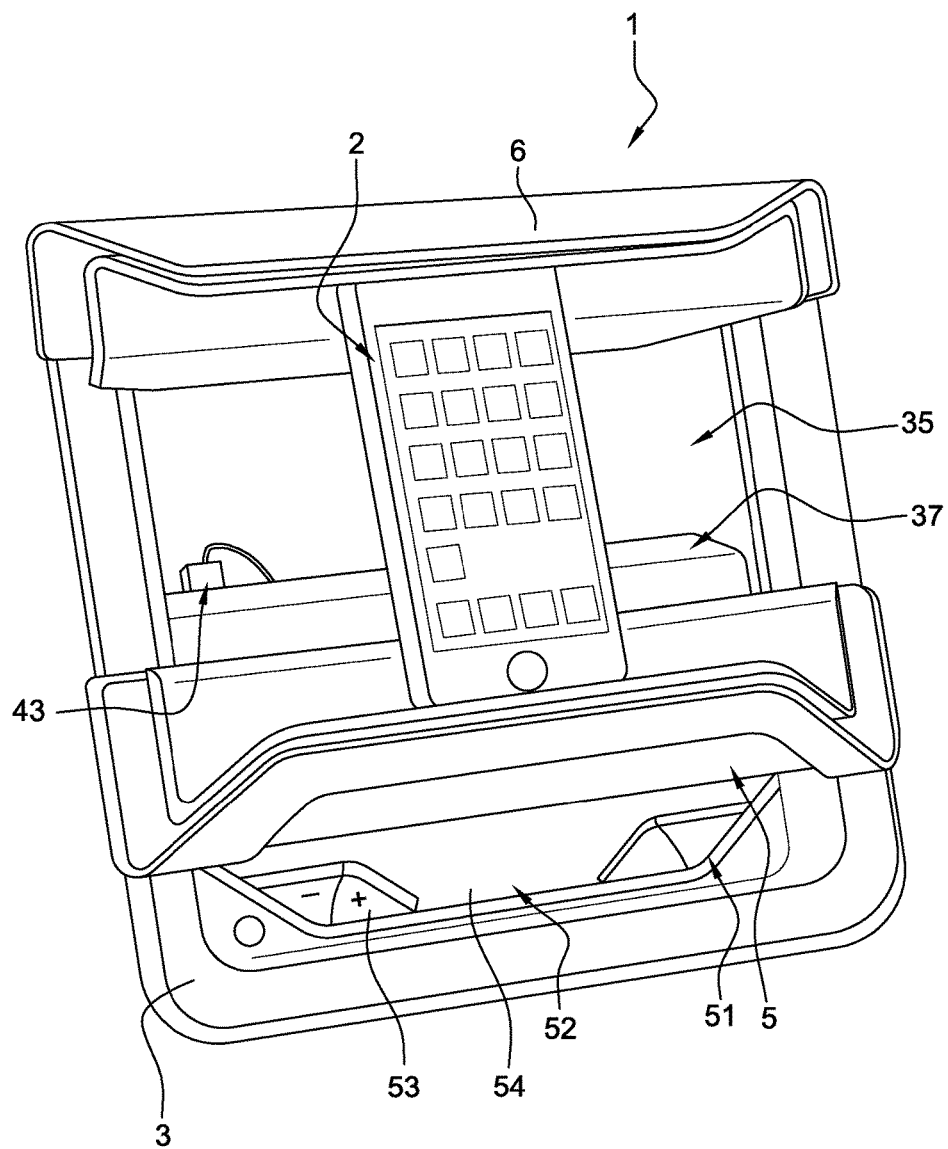
FIG. 1 is a perspective view of a support according to an embodiment of the invention, supporting a Smartphone in the "portrait" position.

The support 1, shown in perspective in FIG. 1, is able to support mobile devices with different dimensions.

In the example illustrated in FIG. 1, the support 1 supports a Smartphone 2.

Such a support 1 is designed to be attached on the dashboard of a motor vehicle (not shown), for example near the driver, or on another surface of the passenger compartment of the vehicle. It will be noted that such a support can also be used in fields other than the automotive industry.

Figure 2:
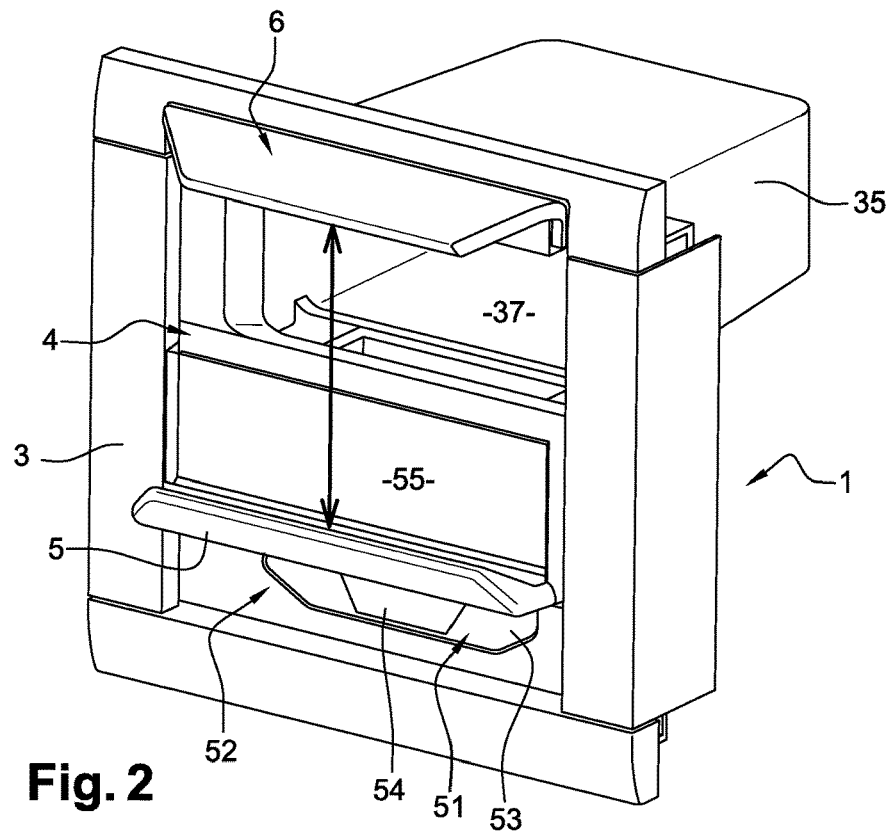
FIG. 2 is another perspective view of the support without a mobile device.
Figure 3:
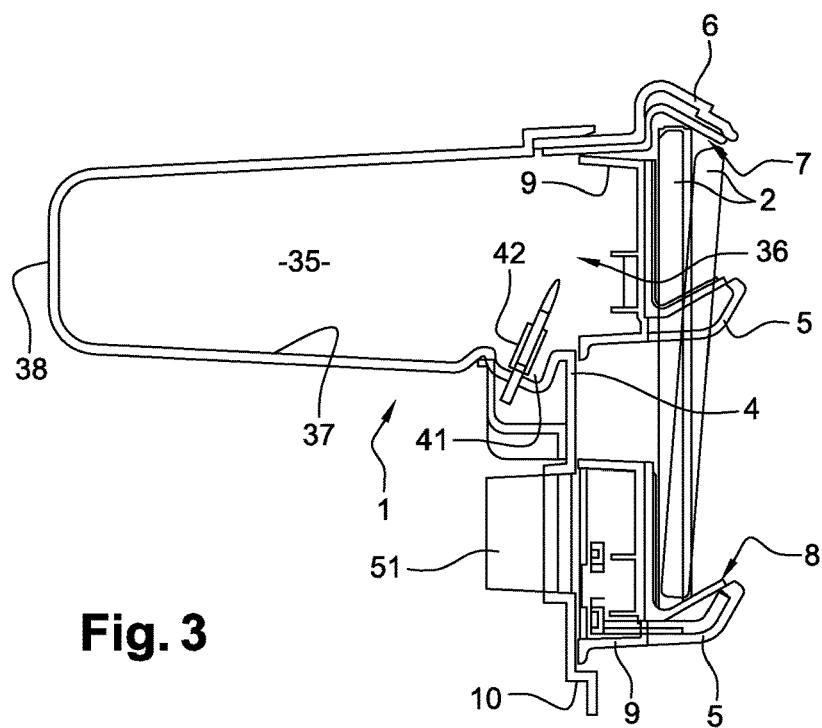
FIG. 3 is a diagrammatic longitudinal sectional illustration of the support illustrating the two extreme positions of the moving jaw.
Figure 4:
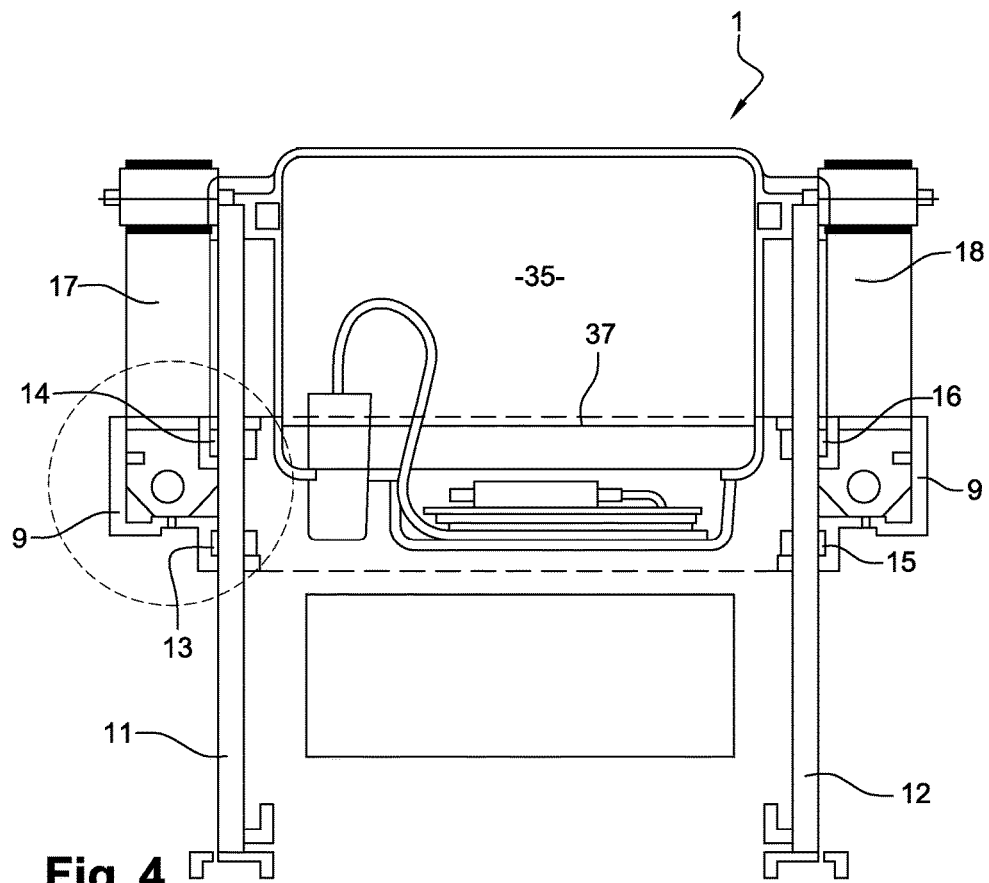
FIG. 4 is a diagrammatic front view of the support, showing the guide element for the carriage of the support.
Figure 5:
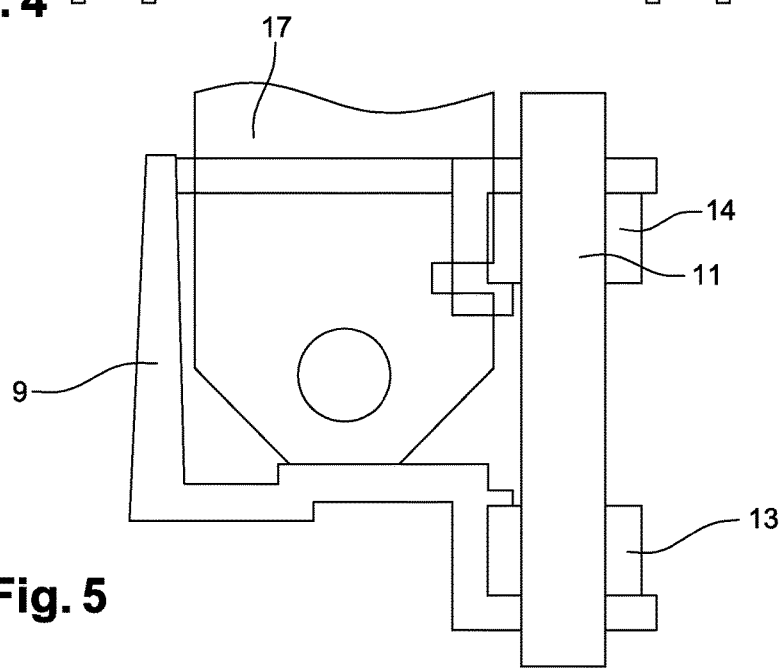
FIG. 5 is a detail view of FIG. 4.

In reference to FIGS. 2 and 3, the support 1 comprises a main body defining a frame 3 with a generally rectangular contour, the front face 4 of which is oriented toward the occupants of the vehicle.

The support 1 is centered relative to the dashboard of the motor vehicle and substantially above the center console so as to be accessible by the driver and the front passenger of the vehicle.

A moving jaw 5 is mounted translatably on the front face 4 of the frame 3, across from a stationary jaw 6.

The stationary jaw 6 is secured to the upper edge of the frame 3 and has a generally rectangular plate shape with a small width extending parallel to the upper edge of the frame, in the plane of the front face 4 of the frame 3. The upper edge of the plate is curved downward so as to define, in straight sectional view (FIG. 2), a hook or nose 7, protruding from the front face 4 of the frame 3. The opening of the nose 7 is determined to receive and maintain an upper edge of a mobile device 2 in a range of thicknesses compatible with Smartphones and other commercially available tablets.

The moving jaw 5 also has a generally rectangular plate shape, extending parallel to the upper edge of the frame, in the plane of the front face 4 of the support 1.

In the usage conditions of the support 1, as shown in the figures, the moving jaw 5 is the lower jaw and the stationary jaw 6 is the upper jaw.

The lower lateral edge of the plate is curved upward so as to define, in straight sectional view (FIG. 3), a nose 8 protruding from the front face of the frame 3. The opening of the nose 8 is also determined to receive and maintain the lower edge of the mobile device 2 in a range of compatible thicknesses of Smartphones and other commercially available tablets.

The moving jaw 5 is secured to a guide body defining a carriage 9 with a generally rectangular shape extending parallel to the upper and lower edges of the frame 3, in the plane of the front face 4 of the frame 3.

The carriage 9 is mounted to be movable in vertical translation relative to the front face 4 of the frame 3.

The travel of the carriage 9, symbolized by a double arrow in FIG. 2, is limited in its lower part by a lower stop 10 (FIG. 3) formed by a recess toward the front of the lower edge of the frame 3 and it is limited, in its upper part, by the upper inner edge of the frame 3 (FIG. 3).

In reference to FIGS. 4 to 7, the carriage 9 is mounted sliding on two vertical guide ramps 11 and 12, which, in the illustrated example, are cylindrical guide rods with a circular section.

The guide rods 11, 12 are continuously rectilinear. They are positioned symmetrically relative to the vertical median plane PM of the support 1 combined with the vertical median plane of the frame 3. They are positioned in the vicinity of the left and right edges of the frame 3, behind the frame 3. The two rods 11 and 12 are respectively attached by their lower and upper ends to the body of the support 1. The carriage 9 is mounted sliding on the two guide rods 11 and 12 via two bearings 13, 14 and 15, 16 per guide rod 11 or 12: a lower bearing 13, 15, respectively, and an upper bearing 14, 16, respectively.

The moving jaw 5 is thus brought slidingly by the carriage 9 along the guide rods 11 and 12 from top to bottom or from bottom to top between the upper and lower stops 10 of the support 1.

FIG. 3 shows the high and low extreme positions that the moving jaw 5 can assume.

The dimensions of the moving jaws 5 and 6, and in particular their heights, are determined to leave a sufficient distance between the noses 7 and 8 so as to allow the introduction of a lower edge of the mobile device 2 when the support 1 is in "idle" mode.

Figure 8:
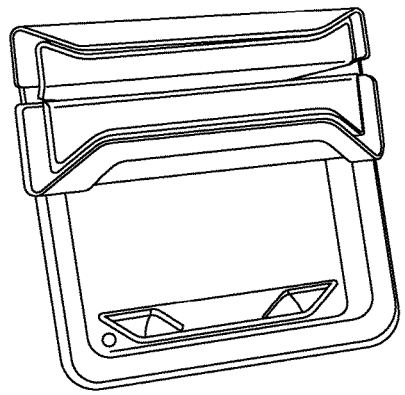
FIGS. 8 to 11 show a sequence of views illustrating, in order, an operating mode for attaching a Smartphone in "portrait" mode and centered on the support.

The support 1 is said to be in "idle" mode when the moving jaw 5 is in contact with the stationary jaw 6 (FIG. 8).

In FIG. 3, the Smartphone is shown in ghost lines during the adjustment of the height of the moving jaw 5 and at the end of the adjustment; the Smartphone 2 being in a maintained position. The maximum movement travel of the moving jaw 5 relative to the stationary jaw 6 is determined to receive a large mobile device, for example a tablet measuring 7.9" (screen with a 20 cm diagonal) in "landscape" mode.

In order to be able to keep the moving jaw 5 against the stationary jaw 6 without the mobile device, and which otherwise, by gravity, would naturally fall against the lower stop 10 of the support 1, the support 1 includes return elements, here two barrel springs 17 and 18, rotatably supported in the upper part of the body of the support 1 at the rear of the frame 3. The two barrel springs 17 and 18 are positioned on either side of the body 1, at the rear frame 3; their two rotation axes being aligned and extending parallel to the upper edge of the frame 3. The two free ends of the springs 17 and 18 are mechanically coupled to the two outer parts of the carriage 9, respectively.

The traction forces exerted by the two springs 17 and 18 are chosen to be identical to balance the forces on the two extreme parts of the carriage 9, and their intensity is determined to make it possible to separate the moving jaw 5 without the user having to provide excessive effort in the different manipulation steps for adjusting the moving jaw 5.

Figure 9:
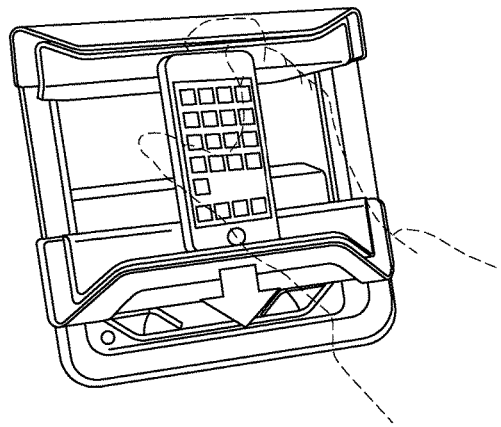
Figure 10:
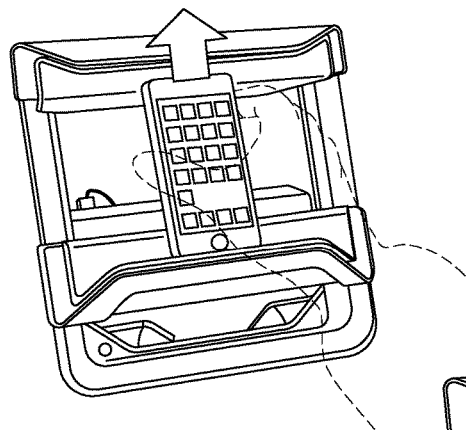
Figure 11:
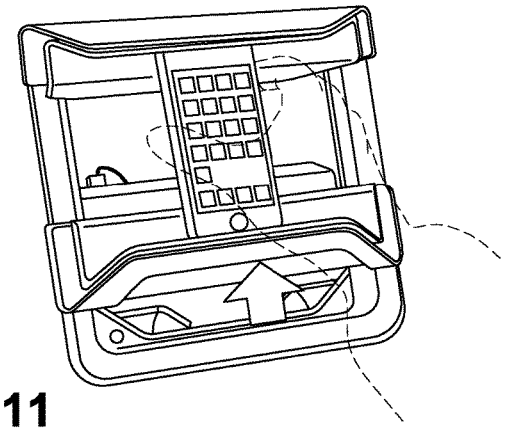
Figure 12:
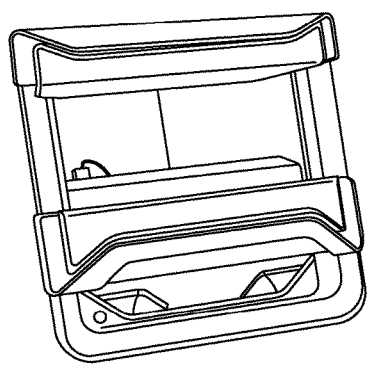
FIGS. 12 to 17 are views illustrating different configurations of the fastening support: without a mobile device, with one or two mobile devices, in different portrait or landscape modes and with different dimensions.
Figure 13:
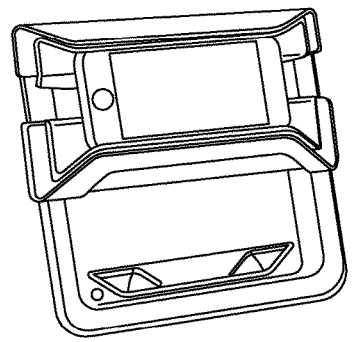

These steps are illustrated in a logical order in FIGS. 9 to 11.

In a first step, illustrated in FIG. 9, the user, using one hand, presents the lower edge of the Smartphone 2 bearing on the moving jaw 5, then adjusts the separation (height adjustment) of the moving jaw 5 by exerting an appropriate downward pressure force on the moving jaw 5, via the smartphone 2 such that its upper edge passes below the stationary jaw 6. In this case, the pressure force exerted on the moving jaw 5 opposes the traction force exerted by the return springs 17 and 18 on the moving jaw 5.

In a second step, illustrated in FIG. 10, the user, through a tilting movement of the Smartphone 2 toward the front face 4 of the support 1, places the upper rear part of the Smartphone 2 in contact against the planar part of the stationary jaw 6 while maintaining the downward pressure. In a third step, illustrated in FIG. 11, the user, while keeping the mobile device 2 in hand, releases the pressure and the moving jaw 5 naturally moves back upward under the effect of the return springs 17 and 18. The tightening is therefore done automatically under the action of the return springs 7 and 18.

During these different steps, the movement of the moving jaw 5 is done continuously either toward the bottom of the support 1 or toward the top, and the maintenance of the Smartphone 2 in the final position is ensured solely by the return force of the springs 17 and 18.

In the embodiment illustrated in the figures, the support 1 further includes a housing 35 with a generally parallelepiped shape, extending from the front face 4 of the support 1 toward the rear of the body of the support 1. The housing 35 includes an opening 36 that emerges on the front face 4 of the frame 3 in the upper part of the frame 3. The opening 36 is generally rectangular and its upper, left and right edges are respectively defined by the corresponding edges of the frame 3.

The housing 35 defines a storage space whereof the dimensions are in accordance with the standards in the area. The housing 35 includes a planar lower face 37 that extends from the opening 36 of the housing 35 toward the bottom 38 of the housing 35. This face 37 is able to receive different objects with dimensions compatible with those of the housing 35.

Figure 6:
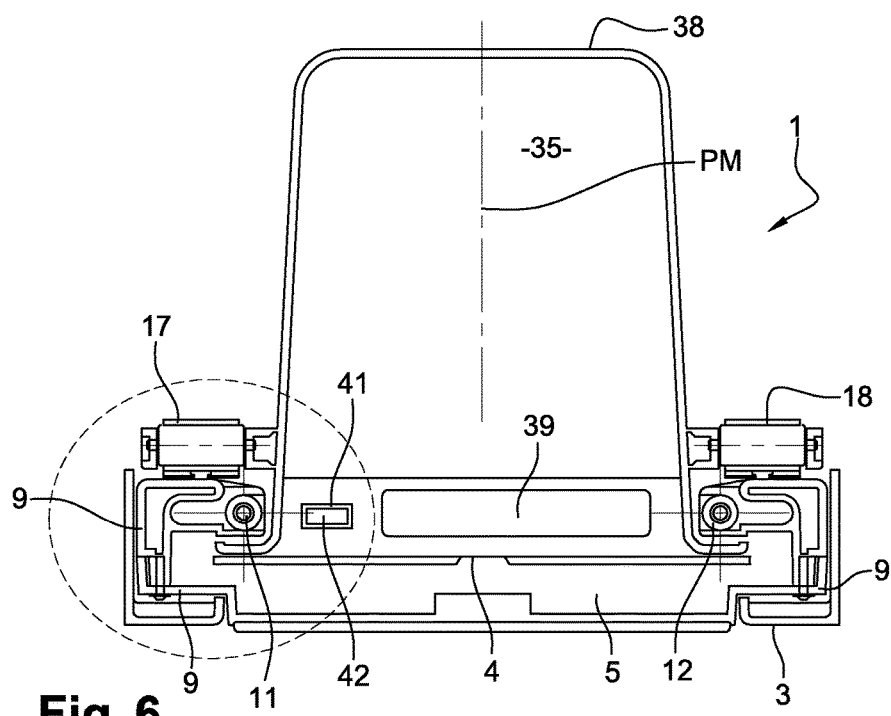
FIG. 6 is a diagrammatic top view of the support, showing the guide element of the carriage.
Figure 7:
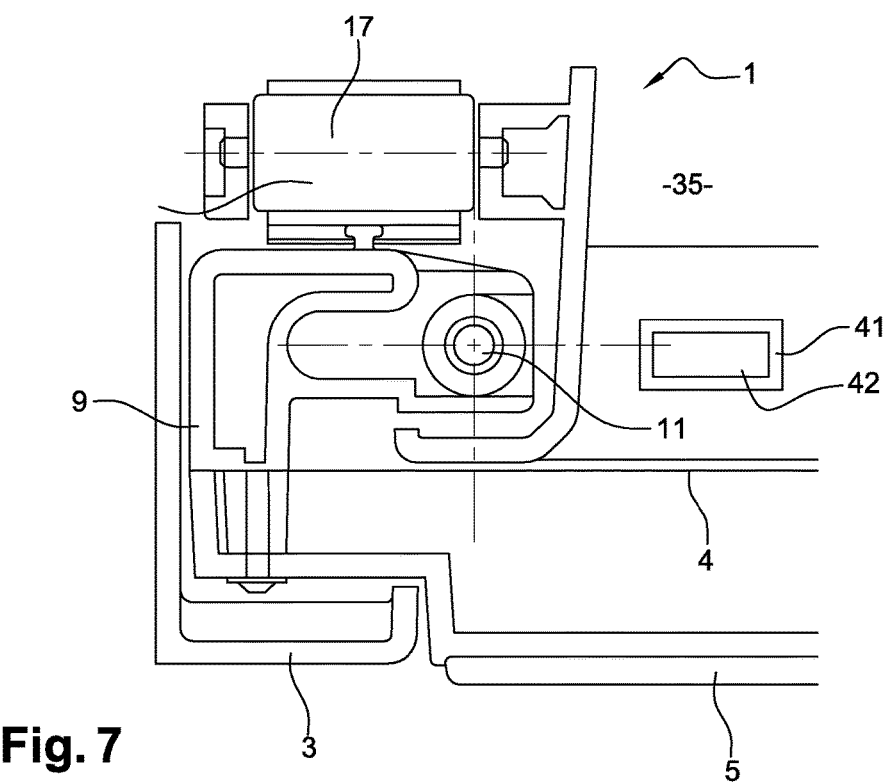
FIG. 7 is a detail view of FIG. 6.

In the embodiment illustrated in FIG. 6 in particular, the housing 35 further includes a first housing 39 for storing a cable, not shown, such as the power cable of the Smartphone 2, and a second housing 41 able to support the male jack 42 of a connector 43, for example of the USB type.

The housings 39 and 41 define trays with a generally parallelepiped shape, aligned along their large dimensions and the openings of which are flush with the lower face 37 of the housing 35.

These two housings 39 and 41 are positioned at the inlet of the housing 35, at the interface between the front face 4 of the frame 3 and the opening 36 of the housing 35, such that the USB jack 42 and the storage tray 39 for the cable are easily accessible by the user from the front face 4 of the frame 3.

The housings 39, 41 are either integral with the housing 35 or attached in the lower face 37 of the housing 35.

The access to the opening 36 of the housing 35 is conditioned by the relative position of the moving jaw 5 with respect to the stationary jaw 6, and by the presence of one or more mobile devices as well as the dimensions and positions of the mobile device(s) on the support 1.

The moving jaw 5 is configured to close off the opening 36 when it is in contact with the stationary jaw 6.

Thus, the moving jaw 5 advantageously serves both as a maintaining member for the Smartphone 2 and a closing off member for the access opening 36 to the storage space defined by the housing 35.

The different configurations are respectively illustrated in FIGS. 8, 12 to 17.

Figure 18:
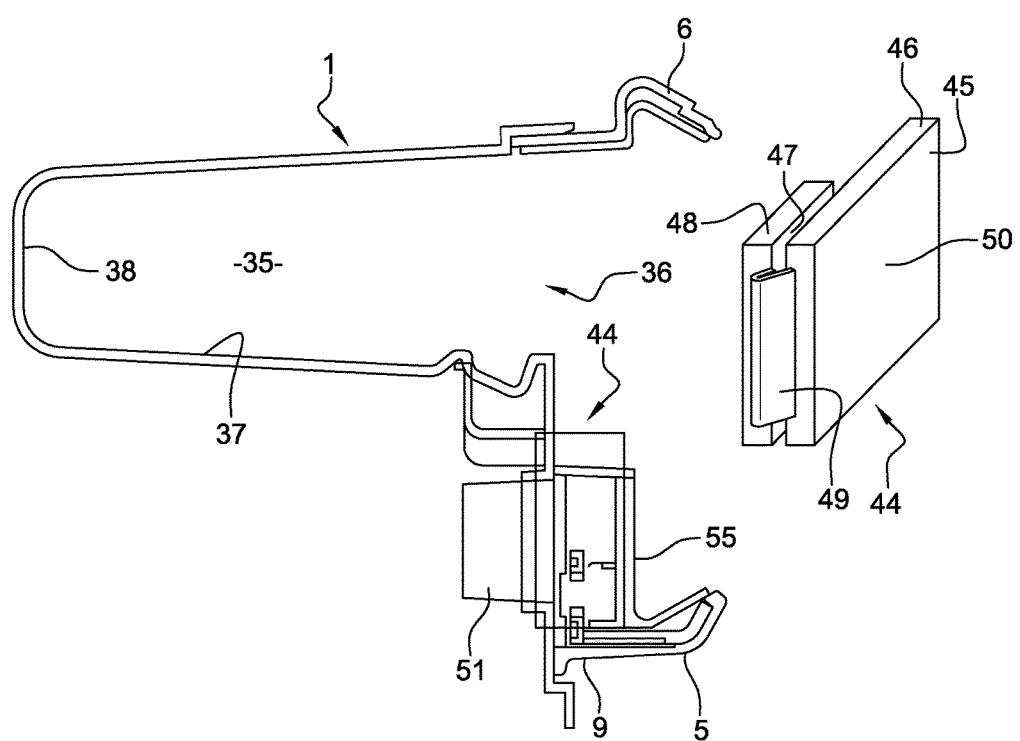
FIG. 18 is a diagrammatic longitudinal sectional view of the support showing part of a wireless recharging system.

In another embodiment in reference to FIG. 18, the carriage 9 is equipped with a wireless recharging system 44, in particular a recharging system by magnetic induction, including a magnetic circuit 45 comprising one or more coils made from technology of the planar type, supported by a first printed circuit board 46, and an electronic control circuit 47 of the magnetic circuit 46, supported by a second printed circuit board 48.

The printed circuit boards 46 and 48 are electrically connected to one another by a web of electric conductors 49. This embodiment with two printed circuit boards 46 and 48 is particularly advantageous in a reduced bulk. Indeed, the two boards 46 and 48 are advantageously superimposed. The active face 50 of the recharging system 44 corresponding to part of the circuit 45, supported by the printed circuit board 46, is oriented toward the outside of the support 1 and bears at the rear of the vertical planar part 55 of the moving jaw 5. This outer face 50 can also be combined with the planar part 55 of the moving jaw 5.

In one embodiment, the support 1 further supports, in its lower part, a radio module 51 whereof the control facade 52, supporting control buttons 53 and a display 54, is flush with the front face 4 of the frame 3 of the support 1 (FIG. 1).

Figure 14:
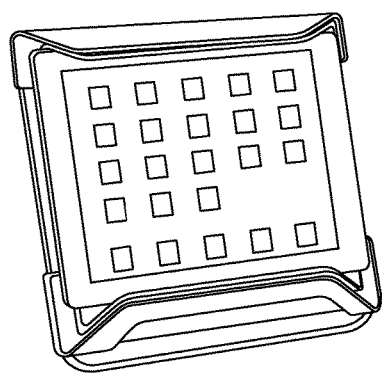
Figure 15:
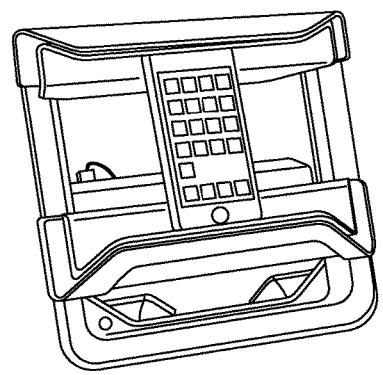
Figure 16:
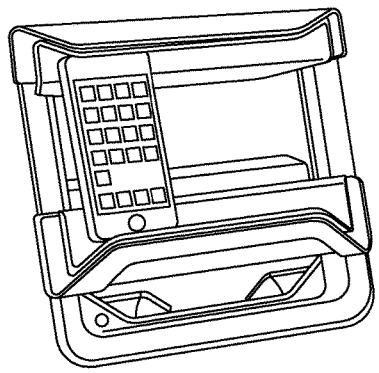
Figure 17:
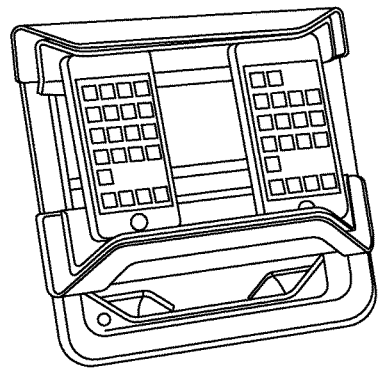

As illustrated in FIGS. 12 to 17, the facade 52 of the radio module 51 is accessible in most of the configurations, with the exception of that where the support receives the tablet in "landscape" mode (FIG. 14).

The support 1 thus makes it possible to integrate several functionalities that cohabitate and cooperate with one another in a bulk not exceeding or only slightly exceeding a tablet measuring 7.9" and that is integrated into the design of a motor vehicle dashboard.

The body of the support can be attached on the front face of the dashboard or integral with the latter.

The invention claimed is:

1. A support for a mobile device comprising a front face bearing a stationary jaw secured to the support, said support also comprising a moving jaw facing the stationary jaw, mounted in translation on the front face of the support, the support comprising a main body defining a frame, the stationary jaw being secured to an upper edge of the frame, wherein the moving jaw is able to receive a side edge of the mobile device, and the support further includes at least one guide ramp secured to the support, on which the moving jaw is slidingly mounted between a separated position, in which the mobile device is placed against the moving jaw, and a maintaining position, in which the mobile device is kept pressed against the stationary jaw, the at least one guide ramp having lower and upper ends and being respectively attached by the lower and upper ends to the main body of the support, and wherein the support further comprises at least one return element, secured to the support, cooperating with the moving jaw over the entire length of the guide ramp and able to clamp the mobile device against the stationary jaw stably in any position of the moving jaw between the separated position and the maintaining position, and wherein the moving jaw is kept against the stationary jaw when there is no mobile device.

2. The support according to claim 1, wherein the return element comprises a barrel spring mounted rotatably on the stationary jaw and the free end of which is fastened to the moving jaw.

3. The support according to claim 1, wherein the guide ramp is a cylindrical tube.

4. The support according to claim 1, wherein the front face of the support is generally rectangular, and the frame comprises an opening, and wherein the stationary and moving jaws are generally rectangular and respectively extend parallel to one another and parallel to one of the edges of the frame; the moving jaw being able to translate in a direction perpendicular to that along which its large dimension extends.

5. The support according to claim 4, comprising a housing extending behind the support from the front face of the support and defining a storage space accessible through the opening of the frame.

6. The support according to claim 4, wherein the moving jaw is able to close off said opening.

7. The support according to claim 4, wherein the housing is integral with the support.

8. The support according to claim 4, comprising two guide ramps, each of them being positioned on either side of the opening of the frame, and comprising two return elements, each of them being positioned across from each of the ends of the large dimension of the moving jaw.

9. The support according to claim 1, wherein the moving jaw is the lower jaw, considering the support oriented in its usage position.

10. A motor vehicle dashboard, comprising a support according to claim 1, the body of which is either integral with the dashboard or attached on the dashboard.

11. A support for a mobile device comprising a front face bearing a stationary jaw secured to the support, said support also comprising a moving jaw facing the stationary jaw, mounted in translation on the front face of the support, wherein the moving jaw is able to receive a side edge of the mobile device, and the support further includes at least one guide ramp secured to the support, on which the moving jaw is slidingly mounted between a separated position, in which the mobile device is placed against the moving jaw, and a maintaining position, in which the mobile device is kept pressed against the stationary jaw, and wherein the support further comprises at least one return element, secured to the support, cooperating with the moving jaw over the entire length of the guide ramp and able to clamp the mobile device against the stationary jaw stably in any position of the moving jaw between the separated position and the maintaining position, wherein the front face of the support is generally rectangular, defining a frame comprising an opening, and wherein the stationary and moving jaws are generally rectangular and respectively extend parallel to one another and parallel to one of the edges of the frame; the moving jaw being able to translate in a direction perpendicular to that along which a large dimension of the moving jaw extends, comprising a housing extending behind the support from the front face of the support and defining a storage space accessible through the opening of the frame.

12. A support for a mobile device comprising a front face bearing a stationary jaw secured to the support, said support also comprising a moving jaw facing the stationary jaw, mounted in translation on the front face of the support, wherein the moving jaw is able to receive a side edge of the mobile device, and the support further includes at least one guide ramp secured to the support, on which the moving jaw is slidingly mounted between a separated position, in which the mobile device is placed against the moving jaw, and a maintaining position, in which the mobile device is kept pressed against the stationary jaw, and wherein the support further comprises at least one return element, secured to the support, cooperating with the moving jaw over the entire length of the guide ramp and able to clamp the mobile device against the stationary jaw stably in any position of the moving jaw between the separated position and the maintaining position, wherein the front face of the support is generally rectangular, defining a frame comprising an opening, and wherein the stationary and moving jaws are generally rectangular and respectively extend parallel to one another and parallel to one of the edges of the frame; the moving jaw being able to translate in a direction perpendicular to that along which a large dimension of the moving jaw extends, comprising two guide ramps, each of the guide ramps being positioned on either side of the opening of the frame, and comprising two return elements, each of the return elements being positioned across from each of the ends of the large dimension of the moving jaw.

* * * * *